(12) United States Patent
McPhilmy et al.

(10) Patent No.: US 6,428,612 B1
(45) Date of Patent: Aug. 6, 2002

(54) HYDROGEN GETTER PACKAGE ASSEMBLY

(75) Inventors: Steven McPhilmy, Frederick, MD (US); Harry Johnson, Springfield, VA (US); Ghassan Zamat, Germantown, MD (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/837,912

(22) Filed: Apr. 19, 2001

(51) Int. Cl.[7] .............................................. B01D 53/04
(52) U.S. Cl. ........................... 96/132; 96/135; 96/139; 96/152; 96/153; 206/0.7
(58) Field of Search ................... 95/116; 96/4, 9, 96/108, 131, 132, 135, 139, 147, 152–154; 206/0.7

(56) References Cited

U.S. PATENT DOCUMENTS

| | | | | |
|---|---|---|---|---|
| 2,578,324 A | * | 12/1951 | Southwick, Jr. | .............. 96/153 |
| 3,108,706 A | * | 10/1963 | Matsch et al. | |
| 3,315,447 A | * | 4/1967 | Meier | ......................... 96/131 X |
| 3,678,662 A | * | 7/1972 | Grote | ......................... 96/131 |
| 3,966,433 A | * | 6/1976 | Molitor | ........................ 95/116 |
| 4,014,346 A | * | 3/1977 | Brownlee et al. | |
| 4,405,487 A | * | 9/1983 | Harrah et al. | .............. 95/116 X |
| 4,717,236 A | * | 1/1988 | Dewing | |
| 4,819,717 A | * | 4/1989 | Ishikawa et al. | .......... 96/154 X |
| 4,830,643 A | * | 5/1989 | Sassa et al. | .................... 96/108 |
| 5,069,694 A | * | 12/1991 | Cullen et al. | ................. 96/154 |
| 5,087,273 A | * | 2/1992 | Ward | ......................... 96/154 X |
| 5,500,038 A | * | 3/1996 | Dauber et al. | ................. 96/135 |
| 5,503,662 A | * | 4/1996 | Berger | ......................... 96/108 |
| 5,743,942 A | * | 4/1998 | Shelley et al. | ............. 96/154 X |
| 5,800,596 A | * | 9/1998 | Collin et al. | ............... 96/108 X |
| 5,888,925 A | * | 3/1999 | Smith et al. | |
| 5,895,519 A | * | 4/1999 | Lorimer | ..................... 96/108 X |
| 6,110,808 A | * | 8/2000 | Saito | |
| 6,168,645 B1 | * | 1/2001 | Succi et al. | ................ 95/116 X |
| 6,299,670 B1 | * | 10/2001 | Applegarth | ................ 96/135 X |
| 6,306,198 B1 | * | 10/2001 | Corbin | ...................... 96/108 X |

FOREIGN PATENT DOCUMENTS

| | | | | |
|---|---|---|---|---|
| JP | 63-036814 A | * | 2/1988 | ................... 96/154 |
| JP | 03-229610 A | * | 10/1991 | ................... 96/154 |
| JP | 04-094703 A | * | 3/1992 | ................... 96/154 |

* cited by examiner

Primary Examiner—Robert H. Spitzer
(74) Attorney, Agent, or Firm—John T. Whelan; Michael W. Sales

(57) ABSTRACT

A hydrogen getter device includes a package made from a material that is hydrogen permeable and moisture impermeable. A preferred hydrogen getter is a particulate zeolite having a portion of its sodium ions exchanged by an activated metal, such as silver. The package can be a flexible enclosure made from the hydrogen permeable moisture impermeable sheet material and surrounded by a porous protecting material. In one embodiment, the package includes an internal wall to define a first enclosure containing the hydrogen getter and a second enclosure containing a moisture absorbing agent or desiccant, such as a zeolite. The package is suitable for use in electrical enclosures having an internal volume of about 5 liters to about 100 liters or more.

40 Claims, 3 Drawing Sheets

HYDROGEN GETTER PACKAGE ASSEMBLY

FIELD OF THE INVENTION

The present invention is directed to a package assembly containing a hydrogen getter and to an electrical enclosure containing a hydrogen getter package assembly. More particularly, the invention is directed to a hydrogen getter package assembly for removing hydrogen from a large volume electrical enclosure and protecting electrical assemblies, and subassemblies of components from hydrogen degradation.

BACKGROUND OF THE INVENTION

Many microelectronic devices such as semiconductors are known to be degraded by exposure to hydrogen. Hydrogen degradation is particularly a problem with certain electronic devices such as pseudomorphic high electron mobility transistors (PHEMT) of monolithic millimeter wave integrated circuits (MMIC). These devices include thin silicon nitride ($Si_3N_4$) passivation layers that provide the sensitive channel little protection from hydrogen degradation. Therefore, very low concentrations of hydrogen in environmentally sealed electrical enclosures can result in hydrogen degradation of the electrical components thereby shortening the useful life of the components.

Hydrogen can be released from various sources within an enclosure containing electronic assemblies and subassemblies. Hydrogen does not readily escape from environmentally sealed enclosures and reacts with the hydrogen sensitive components. Certain metals and nonmetals used to produce the electronic components can contain dissolved hydrogen that is released over time. The package materials such as some plastic materials can also release hydrogen. For example, plated nickel layers used as a barrier layer for gold plating operations and plastic resins are known to release hydrogen in amounts that can degrade the electrical components contained in the sealed enclosure.

Various processes have been proposed in the past to reduce the amount of hydrogen in the enclosure. One effort has been to heat the materials and particularly the housing materials to drive hydrogen and other gases from the materials prior to assembling the enclosure. This method has been successful in some instances where enclosure materials can be effectively depleted of hydrogen or the amount of hydrogen remaining is reduced to a sufficiently low level to minimize hydrogen degradation of the electrical components. This method is only suitable for materials that can be heated to very high temperatures, typically 250° C. and above, without degrading the materials.

The degradation of the electrical component assemblies and subassemblies by hydrogen is not completely understood. The generally accepted explanation is that the platinum group metals function as catalysts for the dissociation of molecular hydrogen to atomic hydrogen. The atomic hydrogen is then able to diffuse into the other areas of the electrical device. It is believed that atomic hydrogen in GaAs transistors diffuses directly into the channel area where it neutralizes the silicon donors or diffuses into the metal, such as titanium, that swells and imposes piezo resistance stresses on the channel.

Another method of controlling the hydrogen concentration in an electrical device is to include a hydrogen scavenger in the package. Hydrogen scavengers are generally referred to in the art as hydrogen getters. Many hydrogen getters require a vacuum or an inert atmosphere.

One form of hydrogen getter uses an alloy of metals such as iron, nickel, titanium, vanadium, zirconium, chromium, cobalt, rare earth metals and other metals that react with hydrogen to form metal hydrides. These hydrogen getters generally require temperatures of over 300° C. to function effectively. The metals are also poisoned by oxygen, water vapor, chlorine and other contaminants. Therefore, this type of hydrogen getter is limited to environments that are able to maintain a sufficient operating temperature. Since many electrical components cannot withstand these temperatures, these systems are generally not useful for electrical enclosures.

Another type of hydrogen getter includes a platinum group metal such as palladium formed on a substrate. One example of a common substrate is activated carbon. The platinum group metal is applied as a mixture of the metal and an unsaturated organic compound, such as diphenyl butadiene or 1,4-bis(phenylethylene)benzene. The platinum group metal functions as a catalyst in the mixture to bind the hydrogen to the functional groups of the organic molecule. These devices operate at moderate temperatures and are not poisoned by oxygen or water vapor. However, a disadvantage of this type of device is the vapor pressure and melting point of the organic component.

Other devices have been proposed to overcome the disadvantages of the prior devices. One example forms a hydrogen getter from a mixture of a platinum group metal, a desiccant, and a gas permeable binder. The binder is cured in a gas with effective amounts of oxygen at a temperature to stabilize the mixture from self-catalytic degradation. An example of this type of hydrogen getter is disclosed in U.S. Pat. No. 5,888,925 to Smith et al.

Another example of a hydrogen getter is disclosed in U.S. Pat. No. 4,014,346 to Brownlee et al. This device discloses a cardiac pacemaker including a hydrogen getter. The hydrogen getter is a palladium sponge or lanthanum pentanickel. The devices have the disadvantage of having a low hydrogen adsorption capacity compared to the volume of the getter. Therefore, these devices are limited to small volume enclosures and devices.

Still another type of hydrogen getter uses a zeolite where at least a portion of the sodium has been replaced with an activated metal. For example, U.S. Pat. No. 3,108,706 to Matsch et al. relates to a vacuum insulator for storing low boiling liquefied gases. The vacuum chamber includes a silver exchanged zeolite. U.S. Pat. No. 4,717,236 to Dewing discloses an optical fiber cable. The cable is filled with a water blocking compound and a zeolite having some of the sodium replaced by silver.

U.S. Pat. No. 6,110,808 to Saito discloses a microelectronic assembly including a hermetically sealed package. The package includes a housing, a base layer bonded to the housing, an intermediate layer of hydrogen absorbing metal, a top layer of metal able to convert molecular hydrogen to atomic hydrogen and is able to absorb hydrogen.

While the above-noted devices have been generally effective for the intended purpose, these devices are not suitable for many environments. The prior devices relating to electronic assemblies utilize expensive rare earth metals and require at least 10 times the surface area compared to other hydrogen getters. In addition, some of these devices require being sealed in a hermetic enclosure to $10^{-7}$ cc/sec (He). Accordingly, there is a continuing need in the industry for improved devices for absorbing and removing hydrogen from an electrical enclosure containing electrical assemblies and subassemblies.

SUMMARY OF THE INVENTION

The present invention is directed to a package assembly for a hydrogen getter. More particularly, the invention is directed to a hydrogen getter package assembly for removing hydrogen from a large volume electrical enclosure and protecting electrical assemblies and subassemblies from hydrogen degradation. The hydrogen getter package is effective in scavenging hydrogen from electrical enclosures having an internal volume of 10s of liters.

Accordingly, a primary aspect of the invention is to provide a package containing a hydrogen getter where the package is made from a hydrogen permeable and moisture impermeable material.

Another aspect of the invention is to provide a package containing an activated metal-ion exchanged zeolite as a hydrogen getter.

A further aspect of the invention is to provide a hydrogen getter package made from a hydrogen permeable, moisture impermeable inner layer and a hydrogen and moisture permeable outer layer.

Another aspect of the invention is to provide a package for a hydrogen getter where the package includes an inner layer of a polyethylene film and an outer layer of a spun bonded polyethylene.

Still another aspect of the invention is to provide a hydrogen getter package having an internal wall forming a first compartment containing a hydrogen getter and a second compartment containing a desiccant. In one embodiment, the compartment containing the hydrogen getter can be evacuated and sealed such that the ambient air and moisture within the cavity is removed so as not to poison the hydrogen getter.

A further aspect of the invention is to provide a hydrogen getter package assembly having a thermal insulating internal wall forming a first compartment containing a hydrogen getter and a second compartment containing a desiccant.

The aspects of the invention are basically attained by providing a package assembly containing a hydrogen getter. The package assembly includes a container, such as a flexible pouch or envelope forming an enclosed cavity. The package includes at least one wall made from a hydrogen permeable and moisture impermeable material.

The aspects of the invention are also attained by providing a hydrogen getter package assembly comprising a package enclosing a hydrogen getter. The package includes a first wall that is permeable to hydrogen and moisture and a second wall that is permeable to hydrogen and impermeable to moisture. The package can include an inner wall forming a first compartment containing the hydrogen getter and a second compartment containing a desiccant.

The aspects of the invention are further attained by a package assembly for a hydrogen getter where the assembly includes a first container made from a hydrogen permeable and moisture impermeable material enclosing a hydrogen getter and a second container enclosing the first container and containing a desiccant. The second container is made from a hydrogen permeable and moisture permeable material.

The various aspects of the invention are further attained by providing an electrical housing for enclosing an electrical component such as a GaAs FET, GaAs MMIC or GaAs HBT electrical device. The housing includes a hydrogen getter assembly that includes a package containing a hydrogen getter. The package includes an inner compartment made from a hydrogen permeable and moisture permeable material, which contains the hydrogen getter. The inner compartment is enclosed within an outer compartment containing a desiccant for adsorbing moisture from the inner compartment. The outer compartment is made from a hydrogen permeable and moisture impermeable material. The hydrogen getter assembly can be placed against the electrical component with the electrical component acting as a heat source to drive moisture from the inner compartment to the adsorbent in the outer compartment.

These and other aspects, advantages and salient features of the invention will become apparent to those skilled in the art in view of the annexed drawings and the following detailed description of the invention.

BRIEF DESCRIPTION OF THE DRAWINGS

The following is a brief description of the drawings which form a part of this original disclosure, in which.

DETAILED DESCRIPTION OF THE INVENTION

The present invention is directed to a package assembly containing a hydrogen adsorbent material or scavenger hereinafter referred to as a hydrogen getter. More particularly, the invention is directed to a hydrogen getter package assembly for removing hydrogen from an electrical enclosure and to a method for protecting electrical components from hydrogen degradation. The hydrogen getter package assembly is particularly suitable for large volume electrical enclosures.

The hydrogen getter package assembly of the invention is shaped and dimensioned primarily for use in an electrical enclosure containing electrical components. The package assembly is particularly suitable for use in large electrical enclosures containing electrical assemblies, electrical subassemblies and other electrical components that are subject to degradation in the presence of hydrogen. Examples of electrical components that can be protected by hydrogen degradation includes GaAs FET, Galas MMIC and GaAs HBT devices. The hydrogen getter package assembly is particularly suitable for large electrical component enclosures that have 10s of liters of internal volume. The package assembly is effective in removing hydrogen from large areas in a manner that is both economical and effective.

The electrical enclosures in some embodiments of the invention can range from about 5 liters to about 100 liters or more that are capable of enclosing a plurality of electrical assemblies or subassemblies. An advantage of the present invention is that it is generally not necessary to hermetically seal the electrical enclosure. In some embodiments, the electrical enclosure can be hermetically sealed or evacuated to remove air and residual moisture in the enclosure.

Figure 1:
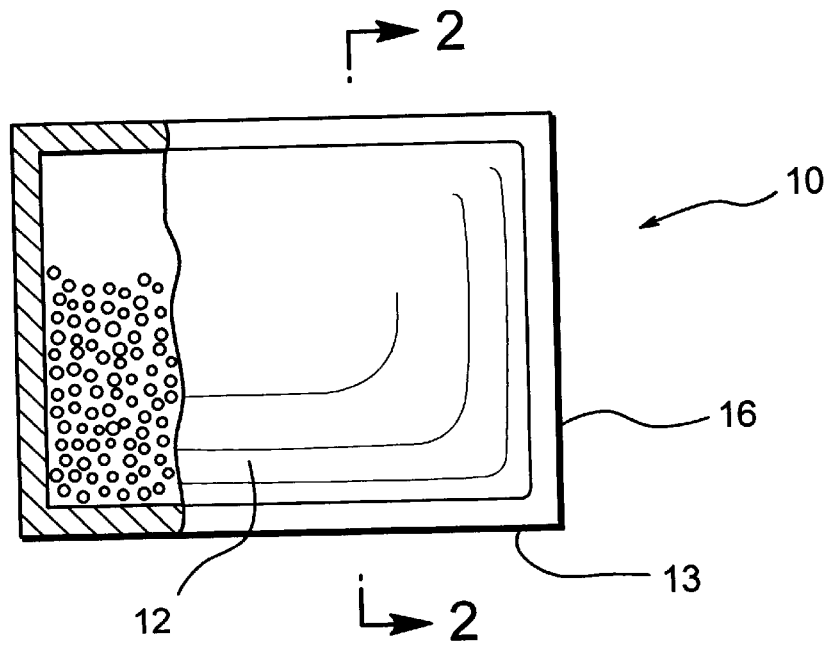
FIG. 1 is a front view in partial cross-section of the package assembly in a first embodiment of the invention.
Figure 2:
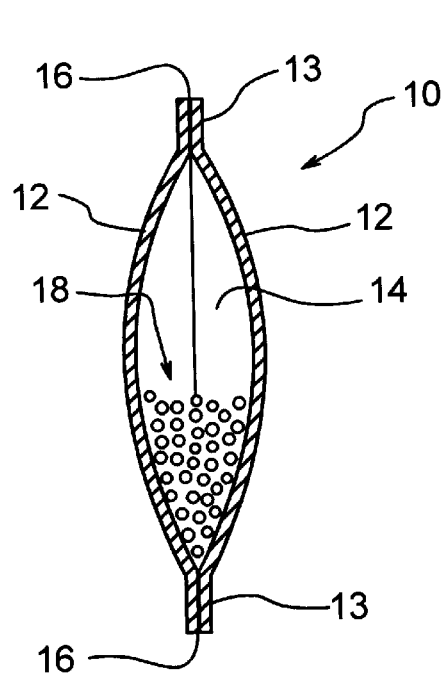
FIG. 2 is a cross-sectional end view of the package taken along line 2—2 of FIG. 1.

Referring to the drawings, a hydrogen getter package assembly 10 in a first embodiment is shown in FIGS. 1 and 2. Package assembly 10 in this embodiment is in the shape of a closed packet or envelope formed from two pieces of flexible sheet material 12. The two pieces of sheet material 12 are bonded together about their respective peripheral edges 13 to define an internal cavity 14. As shown in FIG. 1, the two pieces of sheet material 12 are bonded to form a continuous seal 16 extending around the perimeter of package assembly 10 to completely enclose cavity 14. A hydrogen getter material 18 is enclosed within cavity 14 of assembly 10. Package assembly 10 is shown as a substantially rectangular shaped envelope. It will be appreciated that the shape of package assembly 10 can vary depending on the intended use and the shape and dimensions of the intended environment. Typically, package assembly 10 is sufficiently flexible to conform to the shape and dimensions of the electrical enclosure. In alternative embodiments, package assembly 10 can be made of a rigid material to form a rigid package.

Hydrogen getter material 18 in preferred embodiments is a hydrogen adsorbing particulate material capable of adsorbing hydrogen from the surrounding environment. In a preferred embodiment, hydrogen getter material 18 is a particulate zeolite having at least a portion of the sodium ions exchanged with an activated metal capable of adsorbing hydrogen as discussed hereinafter in greater detail.

Sheet material 12 is preferably a hydrogen permeable material so that hydrogen from the surrounding environment can diffuse into cavity 14 where it can be adsorbed by hydrogen getter 18. Preferably, sheet material 12 is also moisture impermeable to form a vapor barrier to prevent outside moisture from penetrating cavity 14 and inactivating or poisoning hydrogen getter 18. Sheet material 12 is typically a polymeric film that is sufficiently strong to contain hydrogen getter 18 without rupturing during use. Suitable materials that are hydrogen permeable and moisture impermeable include polyethylene and polypropylene, although other polymeric films can be used. Polyethylene having a thickness of about 1 mil is particularly suitable since the sheets of material can be heat sealed to form the closed package assembly and is moisture impermeable.

The dimensions of package assembly 10 and the quantity of hydrogen getter material contained therein is determined by the internal volume of the environment, the expected quantity of hydrogen released to the environment, and the expected working life of the electrical components. Similarly, the hydrogen adsorbing capacity of the hydrogen getter material in relation to expected hydrogen volume is a factor to consider in determining the amount of the hydrogen getter in the assembly.

Sheet material 12 in preferred embodiments is sufficiently hydrogen permeable to allow hydrogen to diffuse from the environment into the package assembly 10 at a rate sufficient to prevent hydrogen degradation of the electrical components. In this embodiment, the sheet material is also moisture impermeable to the extent to prevent moisture from penetrating the package at a rate that will poison or inactivate the hydrogen getter during the working life of the package and the electrical components. Preferably, the hydrogen getter material is selected to provide a rate of hydrogen adsorption, greater than or equal to the rate of release of hydrogen from the hydrogen source. In one embodiment of the invention, package assembly 10 is evacuated to remove air and any moisture from the hydrogen getter.

Figure 3:
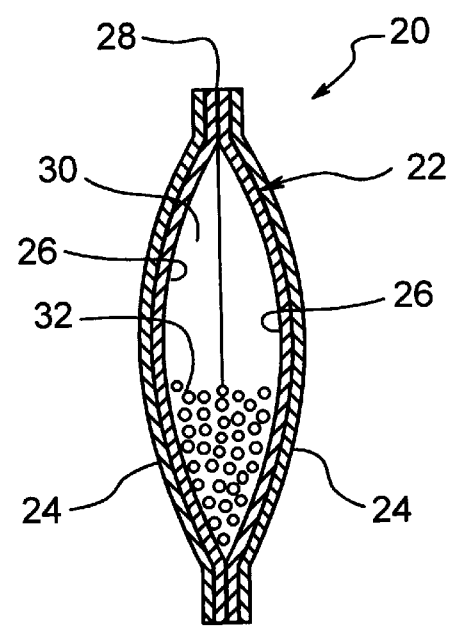
FIG. 3 is a cross-sectional end view of a package according to a second embodiment of the invention.

FIG. 3 is a cross-sectional end view of a second embodiment of the invention showing the hydrogen getter package assembly 20. Package assembly 20 has a shape similar to the embodiment of FIGS. 1 and 2. Package assembly 20 includes an inner package 22 and an outer protecting cover 24.

Inner package 22 is similar to package 10 of the previous embodiment and is formed from two pieces of sheet material 26 that are bonded together to form a peripheral seal 28. Seal 28 completely closes inner package 22 and defines an internal cavity 30 containing a particulate hydrogen getter material 32. As in the previous embodiment, sheet material 26 is preferably a hydrogen permeable and moisture impermeable material.

Outer protecting cover 24 is included to provide sufficient strength to package 20 to prevent rupturing during use. In one embodiment, cover 24 is formed from a spun bonded polyethylene material. Preferably, cover layer 24 is hydrogen permeable and moisture permeable. Outer protecting cover 24 can be a distinct layer overlying sheet material 26 of inner package 22. In further embodiments, outer protecting cover 24 can be laminated to sheet material 26.

Figure 4:
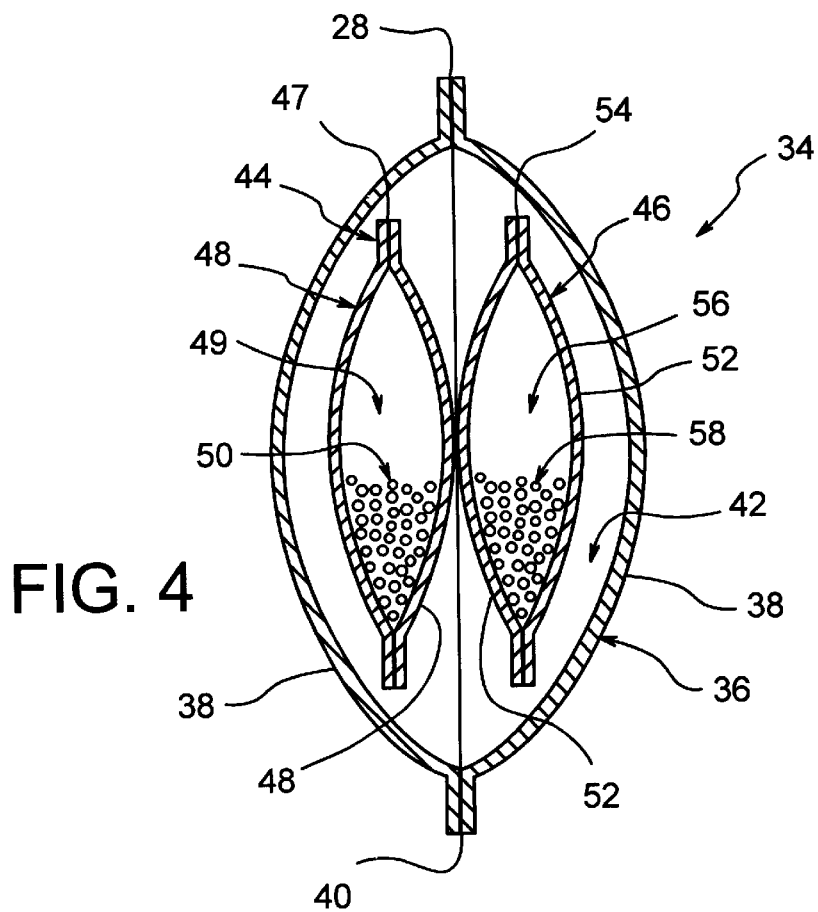
FIG. 4 is a cross-sectional end view of the package assembly in another embodiment of the invention showing a hydrogen absorbing agent and a desiccant in separate packages within an outer package.

FIG. 4 is a cross-sectional end view of another embodiment of the invention showing a hydrogen getter assembly 34. Assembly 34 includes an outer package 36 in the form of an envelope. Outer package 36 is constructed in a similar manner as the previous embodiments and includes a sheet material 38 that is bonded together about the peripheral edges to form a continuous seal 40 and an internal cavity 42. Seal 40 can be formed by an adhesive or by heat sealing methods as known in the art.

Outer package 36 encloses a first inner package 44 and a second inner package 46. First inner package 44 forms an envelope made from two sheets of a hydrogen permeable and moisture impermeable sheet material 48. In the embodiment illustrated, inner package 44 is formed by sealing edges 47 of sheet material 48 together to form an enclosed cavity 49. First inner package 44 contains a particulate hydrogen getter material 50.

Second inner package 46 has a structure similar to the structure of first inner package 44 and is formed from a sheet material 52 of a hydrogen permeable and moisture permeable material. Sheet material 52 is bonded and sealed around its peripheral edges to form a seam 54 and an internal cavity 56. Cavity 56 contains a moisture adsorbing desiccant material 58. Preferably, desiccant 58 is a particulate material capable of adsorbing moisture from the surrounding environment.

The embodiment of FIG. 4 is particularly suitable for electrical enclosures containing electrical components such as electrical assemblies or subassemblies where the enclosure is not hermetically sealed. Outer package 36 in one embodiment can be permeable to hydrogen and permeable to moisture so that hydrogen is able to diffuse into cavity 42 from the surroundings. First inner package 44 is preferably formed from a hydrogen permeable and moisture impermeable material such that the hydrogen can diffuse into cavity 49 of inner package 44 where it is adsorbed by hydrogen getter 50. Preferably, first inner package 44 is sufficiently moisture impermeable to prevent moisture from entering cavity 49 and inactivating the hydrogen getter material. In one embodiment, cavity 49 can be evacuated to remove air and residual moisture from the hydrogen getter. Moisture diffusing into cavity 42 of outer package 36 can diffuse into cavity 56 of second inner package 54 where the moisture is adsorbed by desiccant 58. In this manner, the active life of hydrogen getter 50 is increased as the moisture does not penetrate hydrogen getter 50 and reduce its hydrogen adsorbing properties. In an alternative embodiment, outer package 36 is a hydrogen permeable and substantially moisture impermeable material.

Figure 5:
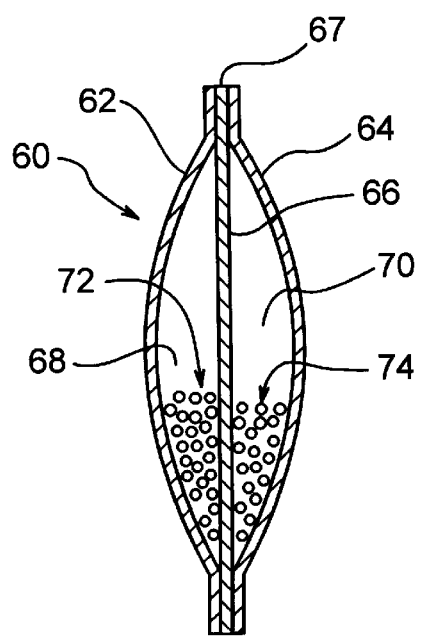
FIG. 5 is a cross-sectional end view of another embodiment of the invention showing an inner wall separating a hydrogen adsorbing agent and a desiccant.

FIG. 5 shows a hydrogen getter package assembly 60 in another embodiment of the invention. In this embodiment, package assembly 60 is in the form of an envelope similar to the previous embodiments. Package assembly 60 is formed from a first sheet material 62, a second sheet material 64, and an inner sheet material 66. Sheet materials 62, 64 and 66 are bonded together about their peripheral edges to form a substantially continuous seal 67. First sheet material 62 and second sheet material 64 are assembled to form a first compartment 68 and a second compartment 70 separated by inner sheet 66. As shown in FIG. 5, inner sheet 66 forms an internal wall separating compartments 68 and 70. In a preferred embodiment, inner sheet 66 is a continuous film having no openings to completely separate first compartment 68 from second compartment 70.

First sheet material 62 in one embodiment is made from a hydrogen permeable and moisture impermeable sheet material. Inner sheet material 66 preferably is made from a hydrogen permeable and moisture permeable sheet material. First compartment 68 defined by sheet material 62 and inner sheet material 66 contains a hydrogen getter material 72 for adsorbing hydrogen that diffuses through sheet materials 62 and 66 into compartment 68.

Second sheet material 64 in one embodiment is also formed from a hydrogen permeable and moisture impermeable sheet material. Second sheet material 64 and inner sheet material 66 defining cavity 70 preferably contains a desiccant material 74. In this embodiment, hydrogen is able to diffuse through first and second sheet materials 62 and 64, respectively, into cavity 68 where the hydrogen is adsorbed by hydrogen getter 72. Any moisture that may enter assembly 60 can pass through inner wall 66 into cavity 70 where it is adsorbed by desiccant 74. In an alternative embodiment, second sheet material 64 is moisture permeable to remove moisture from the surrounding environment as well as from cavity 68 to prevent poisoning of hydrogen getter 72.

Figure 6:
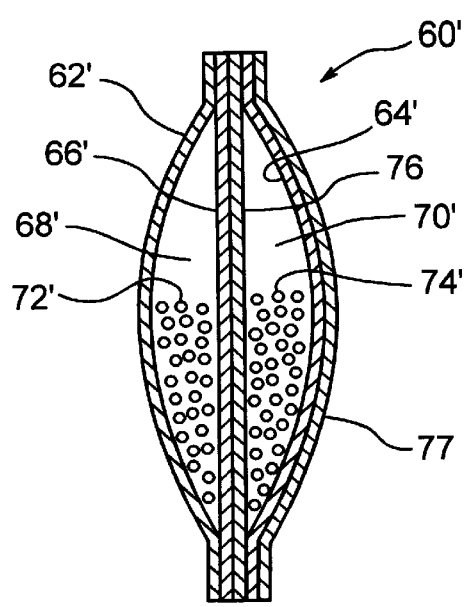
FIG. 6 is a cross-sectional end view of still another embodiment of the invention showing a package with an intermediate wall and a thermal insulator separating a hydrogen adsorbent material from a desiccant.

FIG. 6 shows another embodiment of the invention similar to the embodiment of FIG. 5 with the addition of a thermal insulating material 76. Other elements of the assembly are substantially the same as in the embodiment of FIG. 5 and are indicated by the same reference number with the addition of a prime.

Thermal insulating layer 76 is preferably coextensive with inner wall 66'. Thermal insulating layer 76 is preferably hydrogen permeable and moisture permeable such that moisture in cavity 68' is able to pass into cavity 70' where it is adsorbed by desiccant 74'. The embodiment of FIG. 6 is particularly suitable for use in electrical enclosures having a heat source so that desiccant 74' can be thermally insulated from the heat source. It is desirable to position assembly 60' with thermal insulating layer 76 between desiccant 74' and the heat source to create natural convective forces that will drive either adsorbed or manufactured moisture from the warm hydrogen getter to the cooler desiccant. The embodiment of FIG. 6 shows an optional insulating layer 77 overlying second sheet material 64' to thermally protect desiccant 74'. In further embodiments, insulating layer 77 can be eliminated.

Figure 7:
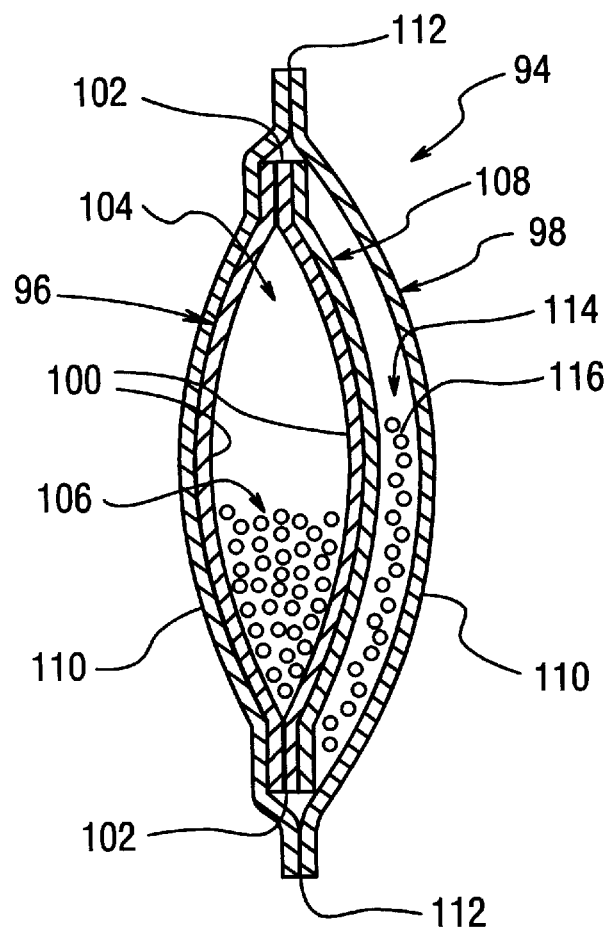
FIG. 7 is a cross-sectional end view of a further embodiment of the invention showing an inner compartment containing a hydrogen getter and an outer compartment containing a desiccant.

In another embodiment shown in FIG. 7, a package assembly 94 includes a first inner container 96 enclosed within a second outer container 98. Outer container 98 can have a shape similar to the embodiment of FIG. 1.

Inner container 96 in the embodiment illustrated is made from two pieces of sheet material 100 defining walls that are bonded together about the peripheral edges 102 to form a substantially closed cavity 104. Preferably, sheet material 100 is permeable to hydrogen and impermeable to moisture to form a vapor barrier. A particulate hydrogen getter 106 is contained within cavity 104. Cavity 104 can be evacuated to remove air and residual moisture. As shown in FIG. 7, a thermal insulating material 108 is coextensive with one wall of inner container 96.

Outer container 98 as shown in FIG. 7 is formed from two pieces of sheet material 110 forming outer walls that are bonded together about the peripheral edges 112 to form a substantially closed cavity 114. Outer container 98 completely encloses inner container 96 in the embodiment illustrated. A desiccant 116 is contained within cavity 114 so that insulating material 108 is oriented between desiccant 116 and hydrogen getter 106. Preferably, sheet material 110 is a durable material that is hydrogen and moisture permeable.

In the illustrated embodiments, the package assembly containing the hydrogen getter is a container in the form of a flexible pouch or envelope. Each of the envelopes can be made from two sheets of material as in the illustrated embodiments or from a single sheet that is folded over. In alternative embodiments, the package assembly can be a rigid container of any suitable shape, size or dimension depending on the particular use. Similarly, the package assembly is shown as having a generally square configuration, although the package can be round, cylindrical, rectangular or other shape, and can be made from a single sheet material or multiple sheet materials.

Figure 8:
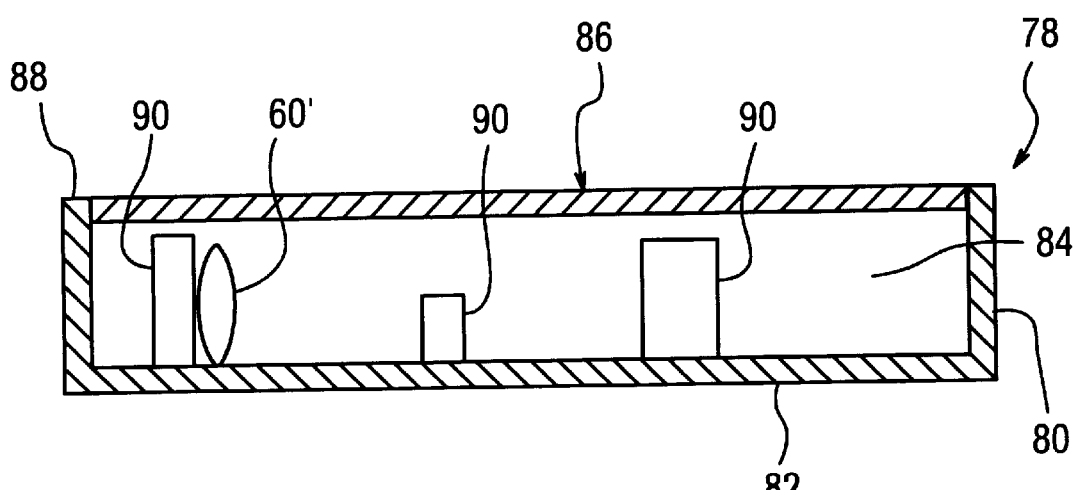
FIG. 8 is a cross-sectional view of an electrical component assembly including electrical components and a package containing a hydrogen adsorbing agent.

In an embodiment of the invention, assembly 60' can be used in an electrical enclosure 78 shown in FIG. 8. Enclosure 78 in the embodiment illustrated includes end walls 80, a bottom wall 82 and an internal cavity 84. In this embodiment, a separate closure 86 is coupled to a top end 88 of side walls 80 to enclose cavity 84. Enclosure 78 contains at least one electrical component 90. It will be appreciated that enclosure 78 is intended to depict an electrical enclosure that includes one or more electrical assemblies, electrical subassemblies or other electrical components and that the shape, dimensions and orientations of the various components can be modified. Enclosure 78 can be hermetically sealed or open. In one embodiment, enclosure 78 is sealed and evacuated to remove the air and the moisture from enclosure 78.

As shown in FIG. 8, package assembly 60' is positioned adjacent an electrical component 90. Preferably, package assembly 60' is oriented with cavity 68' containing hydrogen getter 72' adjacent to electrical component 90. Cavity 70' containing desiccant 74' is spaced from electrical component 90 with thermal insulating layer 76 situated between desiccant 74' and electrical component 90. In this manner, heat that is released from electrical component 90 drives moisture from cavity 68' through inner wall 66' to desiccant 74' where it is adsorbed to prevent poisoning of the hydrogen getter. Thermal insulating layer 76 shields desiccant 74' from the heat from electrical component 90 and drives moisture adsorbed or manufactured from the hydrogen getter to the desiccant. Preferably, package assembly 60' is positioned next to the electrical component that generates the greatest amount of heat in enclosure 78. In this manner, the waste heat from the electrical component can be used as the driving force to drive moisture from the hydrogen getter to the desiccant. Since package assembly 60' contains a desiccant, enclosure 78 is not hermetically sealed, although enclosure 78 can be hermetically sealed in some embodiments.

In the embodiments of FIGS. 6 and 8, package assembly 60' is made from suitable heat resistant materials that are able to withstand the heat generated in the intended environment. Insulating layer 76 can be a permeable film, porous open cell polymeric foam, such as a polystyrene foam, or fibrous mat. In one embodiment, insulating layer 76 is a mat made from glass fibers or polymeric fibers.

In preferred embodiments of the invention, the hydrogen getter is a zeolite material having hydrogen adsorbing properties. Hydrogen adsorbing zeolites are produced by replacing at least a portion of the sodium normally present in zeolites with an active metal making the zeolite capable of adsorbing hydrogen.

Zeolites are sodium aluminum silicates that can occur naturally or can be produced synthetically. The zeolites in preferred embodiments are obtained from zeolite X or zeolite Y where at least some of the sodium is exchanged with an active metal such as silver. Other metals that can be used to replace the sodium include copper, gold, iridium, lead, mercury, nickel, osmium, palladium, platinum, rhenium, rhodium, ruthenium, tin, and mixtures thereof. Silver exchanged zeolites are generally preferred since they can be readily produced and provide suitable hydrogen adsorbing properties.

The active metal exchanged zeolites can be prepared by a number of methods as known in the art. In one embodiment, an active metal exchanged zeolite is prepared by combining a zeolite with an aqueous solution of a salt of the active metal. The resulting exchanged zeolite is then activated by partial evacuation and heating at a temperature of about 200° C. to about 500° C. to dehydrate the zeolite.

The zeolite in one embodiment is a silver exchanged zeolite having at least about 90% of sodium ions replaced by silver ions. In further embodiments, the zeolite can have substantially all of the sodium exchanged by the silver ion. The silver exchanged zeolite can be prepared from a mixture of a zeolite with an aqueous silver nitrate solution. The activated silver exchanged zeolite has a strong attraction for water. The water is subsequently removed from the zeolite by heating under a vacuum. The zeolite used to prepare the hydrogen getter is preferably a zeolite X, although a zeolite Y can also be used effectively.

The silver exchanged zeolite is capable of taking up hydrogen by replacing the silver cations in the zeolite. The reaction takes place at room temperature or slightly above and is exothermic to the extent that hydrogen will produce excessive temperatures in the zeolite. Preferably, the silver exchanged zeolite is maintained at temperatures below about 350° C. to prevent sintering or agglomeration of the metallic silver produced in the reaction.

The desiccant in preferred embodiments is a moisture adsorbing zeolite capable of adsorbing sufficient moisture to prevent poisoning or inactivation of the active metal exchanged zeolite. In alternative embodiments, other desiccants such as activated carbon can be used. The desiccant preferably is stable at the operating temperatures of the assembly and is not corrosive or otherwise damaging to the electrical components.

While various embodiments have been chosen to illustrate the invention, it will be appreciated by those skilled in the art that various changes and modifications can be made without departing from the scope of the invention as defined in the appended claims.

What is claimed is:

1. A hydrogen getter package assembly comprising:
   a package having a first wall and a substantially closed cavity, said first wall being made of a material that is substantially hydrogen permeable and substantially moisture impermeable, and
   a hydrogen getter contained in and completely enclosed within said package.

2. The assembly of claim 1, wherein said hydrogen getter is a hydrogen adsorbent sodium alumina silicate zeolite having at least a portion of its sodium ions replaced by an activate metal.

3. The assembly of claim 1, wherein said hydrogen getter is a zeolite X having at least a portion of the sodium ion exchanged by an activate metal to render said zeolite capable of adsorbing hydrogen.

4. The assembly of claim 3, wherein said hydrogen getter is a silver exchanged zeolite.

5. The assembly of claim 3, wherein said activate metal is selected from the group consisting of palladium, platinum, rhenium, silver, rhodium, ruthenium, tin, copper, gold, iridium, lead, mercury, nickel, osmium, and mixtures thereof.

6. The assembly of claim 1, wherein said package is a flexible pouch made of a material that is substantially hydrogen permeable and substantially impermeable to moisture.

7. The assembly of claim 6, wherein said pouch comprises two pieces of said material having peripheral edges bonded together.

8. The assembly of claim 1, wherein said material is made of polyethylene.

9. The assembly of claim 1, wherein said package further comprises a desiccant.

10. The assembly of claim 1, further comprising a second wall that is substantially permeable to hydrogen and moisture, said first wall being joined to said second wall to form a substantially closed cavity.

11. The assembly of claim 10, wherein said first wall comprises a first outer layer and a second inner layer coextensive with said outer layer.

12. The assembly of claim 11, wherein said first outer layer is made of a spun bonded polyethylene material.

13. The assembly of claim 11, wherein said second inner layer is a polyethylene film.

14. The assembly of claim 13, wherein said polyethylene film has a thickness of about 1 mil.

15. The assembly of claim 11, wherein said second inner layer forms said substantially closed cavity containing said hydrogen getter.

16. The assembly of claim 10, said package further comprising an inner wall forming a first compartment containing said hydrogen getter and a second compartment, said second compartment containing a desiccant.

17. The assembly of claim 16, further comprising a thermal insulating material between said hydrogen getter and said desiccant and wherein said inner wall is moisture permeable to enable moisture to pass from said hydrogen getter to said desiccant.

18. The assembly of claim 16, wherein said desiccant is a zeolite.

19. A hydrogen getter package assembly comprising:
a first inner container made from a material that is moisture permeable and permeable to hydrogen;
a hydrogen getter material enclosed within said inner container;
an outer container enclosing said first inner container, said outer container being made from a second material that is permeable to hydrogen; and
a desiccant material enclosed within said outer container.

20. The assembly of claim 19, wherein said desiccant is disposed between said first inner container and said outer container.

21. The assembly of claim 19, further comprising a thermal insulating layer between said desiccant and said hydrogen getter.

22. The assembly of claim 21, wherein said thermal insulating layer is formed from an insulating material selected from the group consisting of fiberglass and polymeric foam.

23. The assembly of claim 19, wherein said hydrogen getter is a particulate zeolite having at least a portion of its sodium ions exchanged with an activated metal.

24. The assembly of claim 23, wherein said activated metal is selected from the group consisting of silver, palladium, platinum, rhenium, rhodium, ruthenium, tin, copper, gold, iridium, lead, mercury, nickel, osmium, and mixtures thereof.

25. The assembly of claim 19, wherein said first inner container is a flexible pouch made from a polyethylene film.

26. The assembly of claim 25, wherein said outer container is made from a spun bonded polyethylene.

27. The assembly of claim 19, further comprising a second inner container enclosed within said outer container, said second container enclosing said desiccant.

28. The assembly of claim 19, wherein said first container is evacuated.

29. An electrical enclosure assembly comprising:
an enclosure enclosing at least one electrical component; and
at least one hydrogen getter assembly contained within said enclosure, said hydrogen getter assembly including a package assembly having a first wall, said first wall being made of a material that is hydrogen permeable and moisture impermeable, and a hydrogen getter contained within said package.

30. The assembly of claim 29, wherein said hydrogen getter has a hydrogen adsorption rate to prevent degradation of said electrical component by hydrogen in said enclosure.

31. The assembly of claim 30, wherein said electrical component is selected from the group consisting of GaAs FET, GaAs MMIC and GaAs HBT components.

32. The assembly of claim 29, wherein said hydrogen getter is a zeolite having at least a portion of the sodium ions exchanged with an activated metal.

33. The assembly of claim 32, wherein said activated metal is selected from the group consisting of silver, palladium, platinum, rhenium, rhodium, ruthenium, tin, copper, gold, iridium, lead, mercury, nickel, osmium, and mixtures thereof.

34. The assembly of claim 29, wherein said package assembly includes a first compartment containing said hydrogen getter, and a second compartment containing a desiccant.

35. The assembly of claim 34, wherein said desiccant is a zeolite.

36. The assembly of claim 34, wherein said package assembly includes an internal wall formed from a hydrogen and moisture permeable material defining said first and second compartments.

37. The assembly of claim 34, wherein said package assembly is positioned against a heat source in said enclosure, and wherein said package assembly includes a thermal insulating layer between said first compartment containing said hydrogen getter and said second compartment containing said desiccant, and wherein said first compartment containing said hydrogen getter is positioned adjacent said heat source.

38. The assembly of claim 29, wherein said package assembly comprises a first inner package containing said hydrogen getter, said first inner package being made from a hydrogen permeable and moisture permeable material.

39. The assembly of claim 38, wherein said package assembly further comprises an outer package enclosing said first inner package, said outer package being made of said hydrogen permeable and moisture permeable material.

40. The assembly of claim 38, wherein said package assembly further comprises a second inner package containing a desiccant, said second inner package being made from a moisture permeable material.

* * * * *